United States Patent
Izquierdo Millan et al.

(10) Patent No.: US 10,845,100 B2
(45) Date of Patent: Nov. 24, 2020

(54) LOW-POWER ABSORPTION REFRIGERATION MACHINE

(71) Applicant: Consejo Superior de Investigaciones Cientificas, Madrid (ES)

(72) Inventors: Marcelo Izquierdo Millan, Madrid (ES); Emilio Martin Lazaro, Madrid (ES)

(73) Assignee: CONSEJO SUPERIOR DE INVESTIGACIONES CIENTIFICAS, Madrid (ES)

( * ) Notice: Subject to any disclaimer, the term of this patent is extended or adjusted under 35 U.S.C. 154(b) by 122 days.

(21) Appl. No.: 15/315,066

(22) PCT Filed: Jun. 1, 2015

(86) PCT No.: PCT/ES2015/070429
§ 371 (c)(1),
(2) Date: Nov. 30, 2016

(87) PCT Pub. No.: WO2017/001708
PCT Pub. Date: Jan. 5, 2017

(65) Prior Publication Data
US 2017/0153046 A1 Jun. 1, 2017

(30) Foreign Application Priority Data

May 30, 2014 (ES) .................................. 201430831

(51) Int. Cl.
*F25B 15/00* (2006.01)
*F25B 41/06* (2006.01)
*F25B 33/00* (2006.01)

(52) U.S. Cl.
CPC ............ *F25B 15/00* (2013.01); *F25B 15/002* (2013.01); *F25B 33/00* (2013.01); *F25B 41/062* (2013.01);

(Continued)

(58) Field of Classification Search
CPC ........ F25B 15/00; F25B 15/002; F25B 15/04; F25B 15/06; F25B 33/00; F25B 35/00;
(Continued)

(56) References Cited

U.S. PATENT DOCUMENTS 3,949,566 A * 4/1976 Hopkins ................. F25B 15/06
62/475
4,368,624 A * 1/1983 Takeshita .................. F24D 3/18
62/238.3

(Continued)

FOREIGN PATENT DOCUMENTS

CA  1313767 C2  2/1993
EP  2133636 A1  12/2009

(Continued)

OTHER PUBLICATIONS

Whirlpool. (Jul. 12, 2012). Max Distance from Indoor to Outdoor Unit. Retrieved Jul. 13, 2018, from http://forums.whirlpool.net.au/archive/1946400.*

(Continued)

*Primary Examiner* — Nelson J Nieves
*Assistant Examiner* — Miguel A Diaz
(74) *Attorney, Agent, or Firm* — Hayes Soloway PC

(57) ABSTRACT

The present invention relates to a low-power absorption refrigeration machine that enables the use of air as a refrigerant and has an evaporation unit that is separated from the rest of the absorption refrigeration machine and works with $LiBr/H_2O$, $H_2O/NH_3$, $LiNO_3/NH_3$ or similar solutions, configuring an air-air machine wherein cold is produced directly in the enclosure to be air conditioned without need for impeller pumps and fan coils.

13 Claims, 9 Drawing Sheets

(52) U.S. Cl.
CPC ... *F25B 2341/0661* (2013.01); *F25B 2500/29* (2013.01); *Y02B 30/62* (2013.01)

(58) Field of Classification Search
CPC ........ F25B 35/02; F25B 37/00; F25B 41/062; F25B 2341/066; F25B 2341/0661; F25B 2500/29; F25B 35/04
See application file for complete search history.

(56) References Cited

U.S. PATENT DOCUMENTS

| | | | | |
|---|---|---|---|---|
| 4,380,909 A * | 4/1983 | Sung | .......... | F02G 5/00 62/79 |
| 5,205,136 A * | 4/1993 | DeVault | ............. | F25B 15/008 62/476 |
| 5,216,891 A * | 6/1993 | Ryan | ................ | F25B 15/008 62/101 |
| 5,218,844 A * | 6/1993 | Nishiguchi | ........... | F25B 15/008 62/476 |
| 5,335,515 A * | 8/1994 | Rockenfeller | ......... | C09K 5/047 62/476 |
| 5,390,509 A * | 2/1995 | Rockenfeller | ......... | C09K 5/047 62/476 |
| 5,467,614 A * | 11/1995 | DeVault | ............. | F25B 15/008 62/476 |
| 5,775,114 A * | 7/1998 | Ji | ..................... | F24F 3/147 165/104.22 |
| RE36,045 E * | 1/1999 | Rockenfeller | ......... | C09K 5/047 62/476 |
| 9,188,373 B2 * | 11/2015 | Garrabrant | ............. | F24D 12/02 |
| 10,619,893 B2 * | 4/2020 | Tsubouchi | ............. | F25B 15/14 |
| 2005/0022963 A1 * | 2/2005 | Garrabrant | ............. | F25B 15/04 165/58 |
| 2006/0037355 A1 * | 2/2006 | Hwang | ................. | F24F 1/0007 62/428 |
| 2009/0301128 A1 * | 12/2009 | Izquierdo Mill N | ........................ | F25B 15/008 62/483 |
| 2011/0167864 A1 * | 7/2011 | Gu | .......................... | F25B 15/04 62/476 |
| 2012/0227426 A1 * | 9/2012 | Deaconu | ................... | F25B 1/10 62/115 |
| 2013/0091874 A1 * | 4/2013 | Sillato | ................ | H05K 7/20836 62/56 |
| 2015/0168029 A1 * | 6/2015 | Tsubouchi | .............. | F25B 27/02 62/489 |
| 2015/0226472 A1 * | 8/2015 | Scherer | ................. | F25B 31/004 62/115 |
| 2017/0261243 A1 * | 9/2017 | El-Shaarawi | .......... | F25B 27/007 |
| 2017/0328605 A1 * | 11/2017 | Kim | ....................... | F25B 15/06 |
| 2018/0172320 A1 * | 6/2018 | Zhou | ....................... | F25B 15/06 |
| 2018/0224169 A1 * | 8/2018 | Kobayashi | ............. | F25B 17/083 |
| 2020/0248939 A1 * | 8/2020 | Liebendorfer | ........ | F25D 23/006 |

FOREIGN PATENT DOCUMENTS

| | | |
|---|---|---|
| EP | 2549205 A2 | 1/2013 |
| WO | 8602990 A1 | 5/1986 |

OTHER PUBLICATIONS

Bright Hub Engineering. (Aug. 11, 2009), Installation of the Split Air Conditioners: Deciding the Location of Indoor and Outdoor Units. Retrieved Jul. 13, 2018, from https://www.brighthubengineering.com/hvac/45249-indoor-and-outdoor-installation-of-split-air-conditioners-deciding-the-location/.*

* cited by examiner

LOW-POWER ABSORPTION REFRIGERATION MACHINE

OBJECT OF THE INVENTION

The present invention relates to a low-power absorption refrigeration machine that enables the use of air as a refrigerant and has an evaporation unit separated from the rest of the absorption refrigeration machine.

The object of the low-power absorption refrigeration machine of the present invention is to operate with LiBr/$H_2O$, $H_2O/NH_3$, and $LiNO_3/NH_3$ or similar solutions, configuring an air-air machine wherein cold is produced directly in the enclosure to be air conditioned without need for impeller pumps and fan coils.

BACKGROUND OF THE INVENTION

The absorption refrigeration cycle is an alternative, inter alia, to the mechanical vapour compression cycle. The refrigeration machines currently on the market that operate according to this cycle are lithium bromide/water absorption refrigeration machines and water/ammonia refrigeration machines.

In the first case, aqueous lithium bromide solution is used as a working fluid, wherein lithium bromide is the absorbent and water is the refrigerant; in the second case, the working fluid is an aqueous ammonia solution wherein water is an absorbent and ammonia is the refrigerant.

In both cases, the source of energy is heat from the combustion of a fossil fuel or renewable energy source, residual heat from engines or from thermal solar energy or biomass conversion processes, inter alia, which is the main difference with mechanical vapour refrigeration machines.

Furthermore, the two solutions, both the aqueous lithium bromide solution as a working fluid and the water/ammonia solution with water working as an absorbent and ammonia as a refrigerant, have different characteristics that affect the operation of the machines. The lithium bromide/water-operated machine cannot operate at a temperature of less than 0° C. and the solution can crystallise under certain conditions, stopping cold production, while the water/ammonia machine can produce cold at temperatures below zero and does not cause crystallisation problems, but in turn requires a rectification column to separate the water from the ammonia before entering the condenser.

Both types of machine can be built to be condensed by water or by air.

In an absorption refrigeration machine condensed by water, the refrigerant is condensed and the absorbent cooled using a system consisting of a cooling tower equipped with a pump and a fan. The pump transports the condensation water between the tower and the condenser-absorber and the fan impels air through the tower, transporting evaporated water to the atmosphere. The cooling tower has the drawback of causing contamination by *Legionella* and consuming water, which is a scarce resource in dry climates and arid zones.

As regards absorption refrigeration machines condensed by air, the single-effect type work with a water/ammonia solution and lithium bromide/water solution but both use an indirect system, since they produce cold in the evaporator that is separated from the enclosure to be air conditioned, so that in order to transport cold to the feeding points inside the building cold water or a solution must be pumped, with the ensuing need for the use of an impeller pump and a fan coil.

Those of the half-effect and multiple-effect type use an indirect system to transport cold.

The low-power absorption refrigeration machine of the present invention resolves all the aforementioned drawbacks.

DESCRIPTION OF THE INVENTION

The present invention relates to a low-power absorption refrigeration machine, understanding low-power to be machines having an output power of less than 15 kW, which works with LiBr/$H_2O$, $H_2O/NH_3$, $LiNO_3/NH_3$ or similar solutions for use in climate control or air conditioning installations that comprise an exterior unit and an interior unit.

In turn, the external unit comprises:

an absorber capable of maintaining a low pressure and low evaporation temperature when the outside temperature is high, directly cooled by outside air or by water, which carries out separate heat and mass transfer processes, a condenser directly cooled by outside air, at least one refrigerant generator and a heat recuperator.

The refrigerant generator comprises at least one heating chamber that houses a heat exchanger, preferably made of fireproof stainless steel or other material resistant to high temperatures, when the heat source is direct flame, so as to facilitate heat transfer to the lithium bromide/water solution; an exchanger that can use the heat produced by a solar collector field, by a biomass boiler, by a biodiesel boiler, by a bioethanol boiler, by a conventional fossil fuel boiler or the residual heat of engine exhaust gases, batteries or fuel cells, or any thermal process that generates residual heat at a sufficiently high temperature.

The generator may also incorporate, alternatively or supplementarily to the exchanger, a low-, medium- or high-power modulating burner controlled by a PID controller which makes it possible to control the temperature at will, which generates heat in the heat chamber as a consequence of the combustion of a fossil fuel, preferably LPG, NG, Diesel Oil, Biodiesel, Biogas or other.

Additionally, in the case of LiBr/$H_2O$ solutions, the generator has a water vapour separator in the heating chamber. In this case, the working solution is introduced diluted in the heating chamber of the generator, where it absorbs the heat, boiling at a temperature comprised between 85° C. and 115° C. or higher, depending on the temperature of the outside air, producing reheated vaporized refrigerant which is separated in the separator and hot concentrated solution. The water vapour abandons the generator and is impelled towards the condenser, where it is transformed into a liquid and subsequently impelled towards the evaporator through an expansion valve, where it is once again transformed into water vapour. In the case of $H_2O/NH_3$ and $LiNO_3/NH_3$ solutions, the process is similar since the full separation of the refrigerant occurs in a rectification column or tower.

The heat recuperator is preferably a copper-welded plate heat exchanger, in the case of LiBr/$H_2O$ solutions, and transfers the heat of the hot concentrated solution that flows out of the generator to the diluted cold solution that flows out of the absorber, preheating it before being fed into the generator.

The hot concentrated solution that flows out of the generator flows through the recuperator and reduces its pressure in a pressure-reducing valve disposed between the recuperator and the absorber, so as to flow into the absorber at a lower pressure.

The absorber comprises a storage tank, a set of sprayers disposed in the interior of the storage tank wherethrough the hot concentrated solution flows to be sprayed in the interior of the tank, where it is diluted upon coming into contact with the water vapour from the evaporator, a heat exchanger in the exterior of the storage tank, preferably finned, that cools the diluted solution, a recirculation pump that suctions the diluted solution from the storage tank and impels it towards the heat exchanger, wherefrom the cooled diluted solution flows out, returning to the set of sprayers in a continuous recirculation process, reinforcing the increased transfer of mass and heat. This recirculation pump also supplies diluted solution to the generator through the heat recuperator, where it is preheated before entering the generator, where the solution is reconcentrated.

The absorber transmits the solution absorption heat directly to the ambient air through the heat exchanger.

The interior unit comprises:
  at least one expansion valve that connects the condenser to a direct expansion evaporator through a duct wherethrough liquid refrigerant flows at high pressure. The pressure and temperature are reduced inside the expansion valve to evaporator operating values. The refrigerant in liquid and vapour state flows towards a refrigerant receiver that supplies it to the evaporator which, in turn, comprises:
    a liquid refrigerant distributor,
    a water or air heat exchanger,
    a collector of water vapour, ammonia vapour, etc., integrated in the water or air heat exchanger, and
    a fan that suctions the air of the enclosure to be air conditioned and impels it cooled, mixing it with the hot air of the enclosure.

The exterior unit is separated from the interior unit and both are connected by two ducts: the previously described duct wherethrough the liquid flows at high pressure and a duct that transports the vaporized refrigerant from the evaporator of the interior unit to the exterior unit, once said refrigerant has evaporated.

Therefore, the object of the low-power absorption refrigeration machine is to work with $LiBr/H_2O$, $H_2O/NH_3$, $LiNO_3/NH_3$ or similar solutions, configuring an air/air machine wherein cold is produced directly in the enclosure to be air conditioned without need for the impeller pumps and fan coils of indirect systems that increase the electricity consumption of the ancillary components and raise the cost of the machine.

There are variants for a double-effect absorption refrigeration machine, a single and double-effect absorption refrigeration machine built in a single unit, and a triple-effect and single and triple-effect absorption refrigeration machine built in a single unit, as will be described in the preferred embodiment of the invention.

Since the evaporator disposed in the interior unit and the absorber disposed in the exterior unit are separated by a distance of at least 1 m between shafts, preferably between 1 m and 2 m or greater than 2 m, the machine is of the split type. This distance could be increased in accordance with the application and the solution. In this manner, the liquid refrigerant produced in the condenser is transported a certain distance towards the evaporator and, once evaporated, returns to the suction of the absorber, which coincides with the suction of the thermal compressor, which is formed by the absorber, the recirculation-generator pump, the refrigerant generator, the heat recuperator and the pressure-reducing valve, with no other intermediate mechanical system between the condenser and the suction of the compressor, to recover it and restart the cycle. At the output of the thermal compressor, i.e. at the output of the generator, the refrigerant is in the vapour stage, reheated, which is fed into the condenser to transform it into a liquid and supply it to the expansion valve.

DESCRIPTION OF THE DRAWINGS

In order to complement the description being made and with the object of helping to better understand the characteristics of the invention, in accordance with a preferred embodiment thereof, said description is accompanied, as an integral part thereof, by a set of drawings where, in an illustrative and non-limiting manner, the following has been represented.

PREFERRED EMBODIMENT OF THE INVENTION

Figure 1:
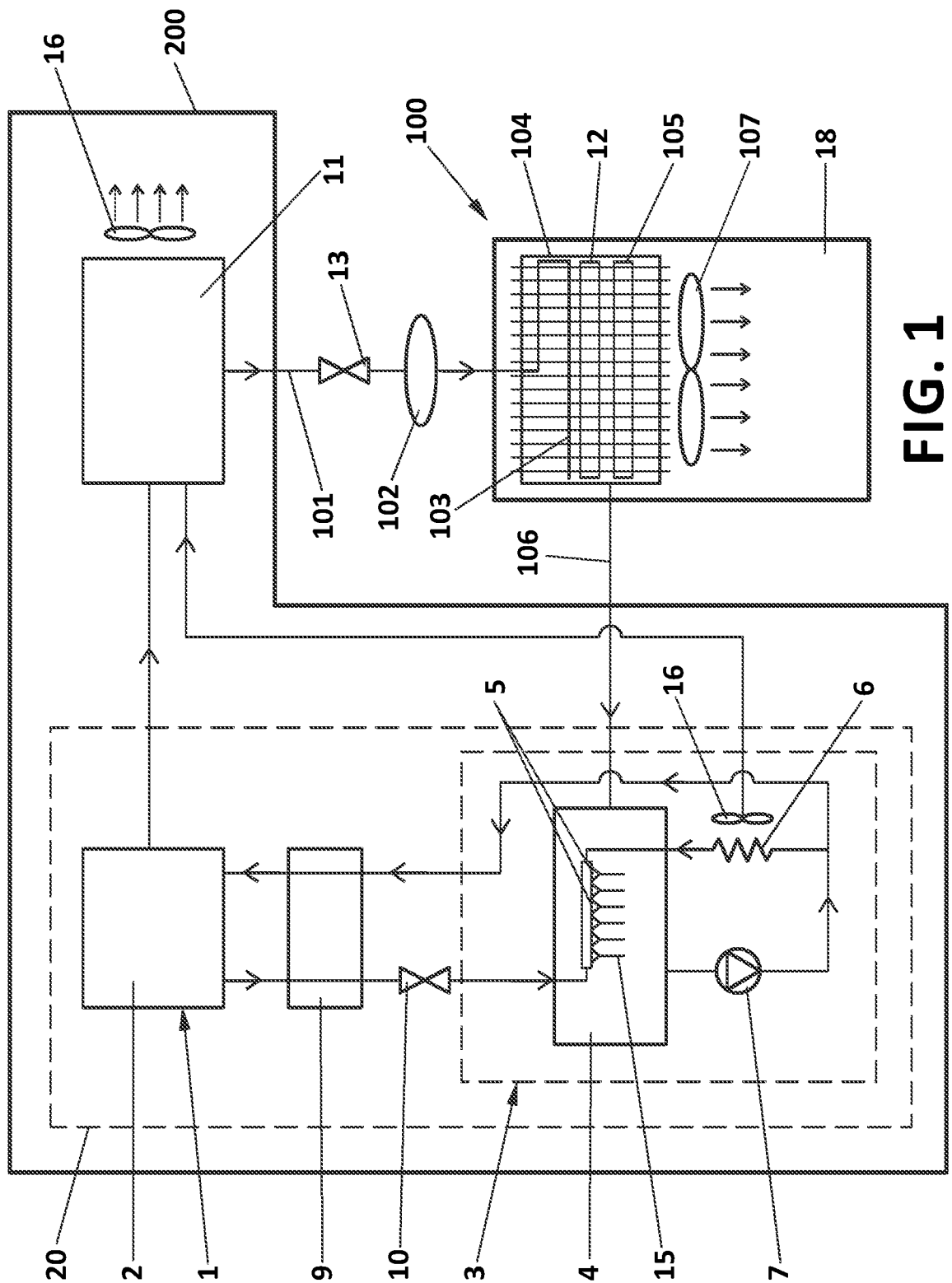
FIG. 1. Shows a diagram of the low-power absorption refrigeration machine of the present invention, when it is of the single-effect type.

In accordance with the diagram shown in FIG. 1, the low-power absorption refrigeration machine of the present invention, of the single-effect type, with a lithium bromide solution for this preferred embodiment comprises an exterior unit (200) and an interior unit (100).

The exterior unit (200) comprises:

a refrigerant generator (1) having a heating chamber (2) adapted to heat a lithium bromide/water solution that includes a water vapour separator (not represented), an absorber (3) comprising: a storage tank (4), a set of sprayers (5) disposed in the interior of the storage tank (4) wherethrough the hot concentrated solution flows, which is subsequently projected in the interior of the storage tank (4) for dilution thereof, a heat exchanger (6) in the exterior of the storage tank (4) that cools the diluted solution, a recirculation-generator pump (7) that suctions the diluted solution of the storage tank (4) and impels it towards the generator (1), for concentration thereof, and towards the heat exchanger (6) wherefrom the cooled diluted solution flows, returning to the set of sprayers (5) in a continuous recirculation process, and a heat recuperator (9) disposed between the generator (1) and the absorber (3) wherein heat from the hot concentrated solution that flows out of the generator (1) is transferred to the diluted cold solution that flows out of the absorber (3), preheating it, before being fed into the generator (1), a pressure-reducing valve (10) disposed between the heat recuperator (9) and the absorber (3), a condenser (11) connected to the generator (1) that condenses the water vapour produced inside the generator (1), connected to the evaporator (12) adapted to introduce water vapour inside the absorber (3).

If a water/ammonia solution is used, the vapour separator is replaced by a fractionating column.

In a first example of embodiment shown in FIG. 1, the interior unit (100) comprises:

an expansion valve (13) that connects the condenser (11) to an evaporator (12) through a duct (101) wherethrough the liquid refrigerant flows at high pressure by means of a refrigerant receiver (102) in a liquid state and in a vapour state at low pressure, wherein the pressure and temperature are reduced in the expansion valve (13) to evaporator (12) operating values which, in a non-exhaustive example, may be the following: a pressure of 10-15 mbar and a temperature of 10° C. to 15° C. for a LiBr/H$_2$O solution and a pressure of 1.5-5 bar and a temperature of −25° C. to 15° C. for the H$_2$O/NH$_3$ and LiNO$_3$/NH$_3$ solutions. Consequently, the refrigerant is partially evaporated. The pressure values inside the condenser range between 10 and 20 bar, approximately, for the H$_2$O/NH$_3$ and LiNO$_3$/NH$_3$ solutions, and between 0.05 and 0.15 bar, approximately, for the LiBr/H$_2$O solution.

The evaporator (12) is a direct expansion evaporator that comprises:

a liquid refrigerant distributor (103), a water or air heat exchanger (104) that comprises a set of finned tubes, and a collector of water vapour, ammonia vapour, etc. (105) integrated in the evaporator (12), thereby configuring a single-effect direct expansion absorption machine applicable to any solution used as a working fluid, including lithium bromide/water (LiBr/H$_2$O), water/ammonia (H$_2$O/NH$_3$), lithium nitrate/ammonia (LiNO$_3$/H$_2$O) or any other solution requiring an expansion valve (13).

The refrigerant in liquid state and in vapour state at low pressure is separated in the refrigerant receiver (102), wherein the vapour flows towards the vapour collector (105), while the liquid is transported towards the liquid refrigerant distributor (103), which feeds it into the evaporator (12).

In the evaporator (12), H$_2$O or NH$_3$, which act as a refrigerant depending on the solution and which are fed by the distributor (103), circulate through the interior of the tubes, wherein the external fluid is the air of the room or enclosure to be cooled (18), which circulates through the exterior of the tubes and is cooled as a consequence of the low temperature produced by the evaporation of the refrigerant at low pressure in the interior of the tubes. The tubes are finned to increase the heat transfer area. The vapour produced in the interior of the tubes flows towards the vapour collector (105).

A fan (107) is used to cool the air of the room or of the enclosure to be cooled (18), which suctions the hot air of the room and impels it across the external surface of the tubes and of the fins of the heat exchanger. The air is cooled and mixed with the hot air of the room or enclosure to be cooled (18), lowering its temperature and maintaining the internal comfort temperature.

Figure 2:
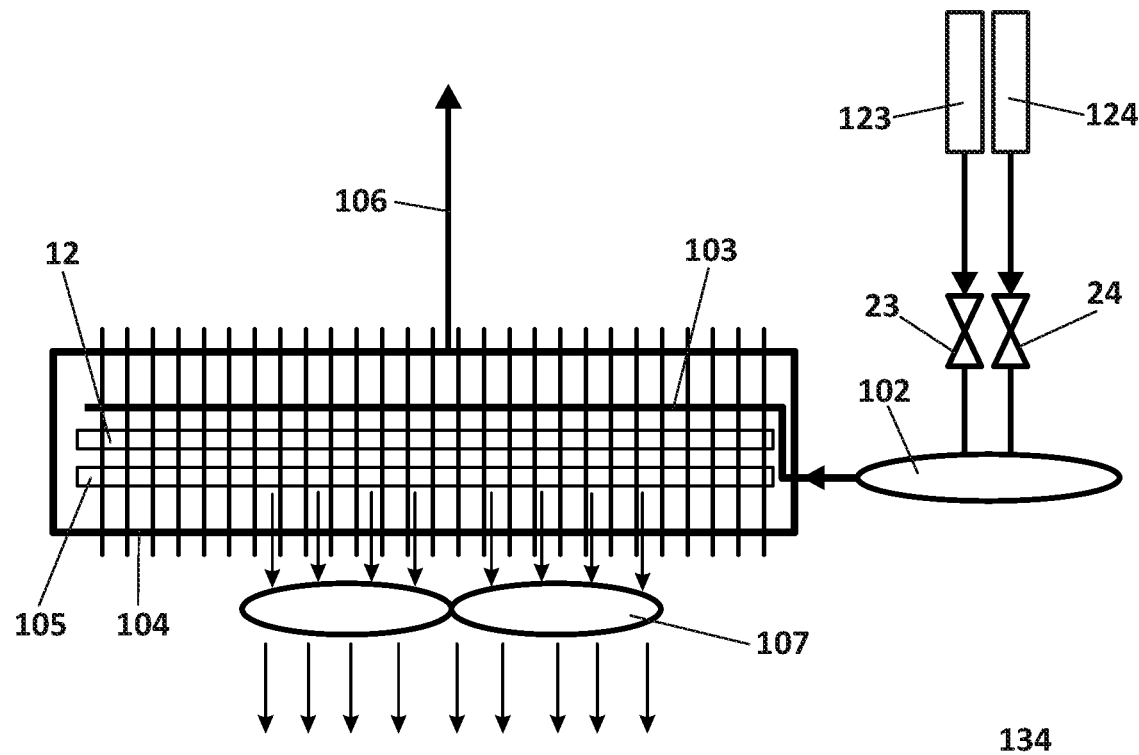
FIG. 2. Shows a diagram of the direct expansion evaporator of the low-power absorption refrigeration machine of the present invention to configure a double-effect low-power absorption refrigeration machine of the present invention to configure a double-effect low-power absorption machine.

In a second example of embodiment shown in FIG. 2, wherein the solution is lithium bromide/water (LiBr/H$_2$O) or a solution with similar physical properties (pressure and temperature), the interior unit (100) comprises the elements described for the first example of embodiment, but wherein the evaporator (12) works with refrigerant from two expansion valves (23, 24): a first expansion valve (23) that feeds refrigerant from a low-pressure generator (123) and a second expansion valve (24) that feeds refrigerant from a high-pressure generator (124), thereby configuring a double-effect direct expansion absorption machine.

Figure 3:
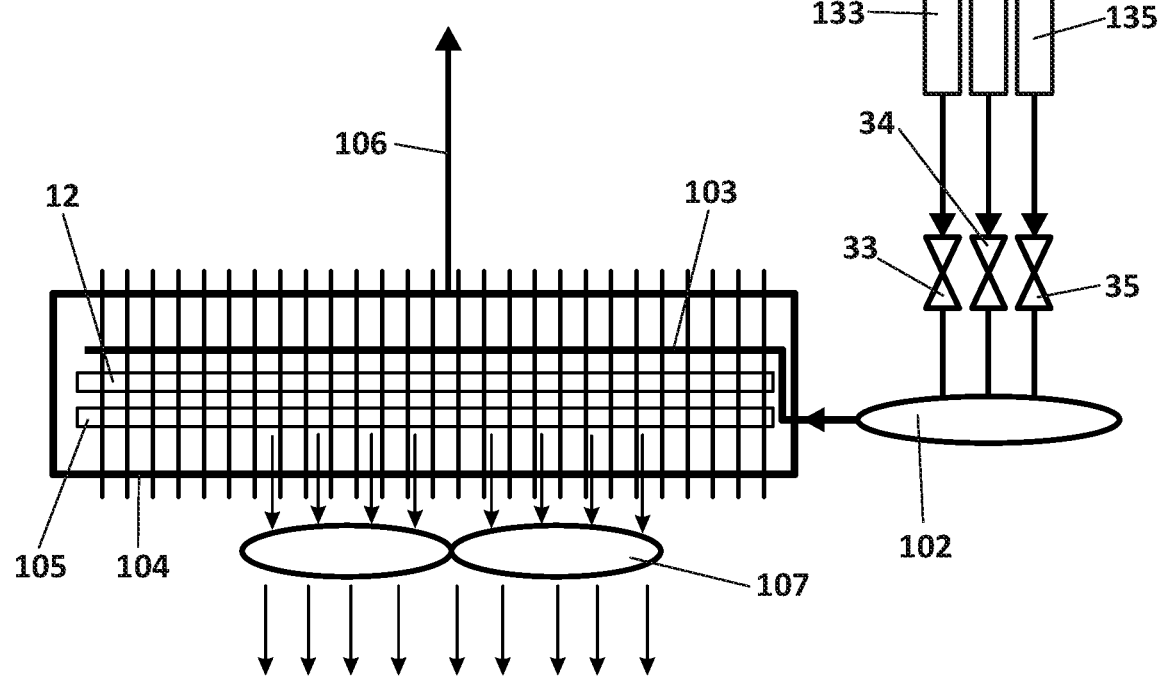
FIG. 3. Shows a diagram of the direct expansion evaporator of the low-power absorption refrigeration machine of the present invention to configure a single- and double-effect absorption machine built in a single unit.

In a third example of embodiment shown in FIG. 3, wherein the solution is lithium bromide/water (LiBr/H$_2$O) or a solution with similar physical properties (pressure and temperature), the interior unit (100) comprises the elements described for the first example of embodiment, but wherein the evaporator (12) works with refrigerant from three expansion valves (33, 34, 35): a first expansion valve (33) that feeds refrigerant from a single-effect generator (133), a second expansion valve (34) that feeds refrigerant from a low-pressure double-effect generator (134) and a third expansion valve (35) that feeds refrigerant from a high-pressure double-effect generator (135), thereby configuring a single and double-effect direct expansion absorption machine built in a single unit.

Figure 4:
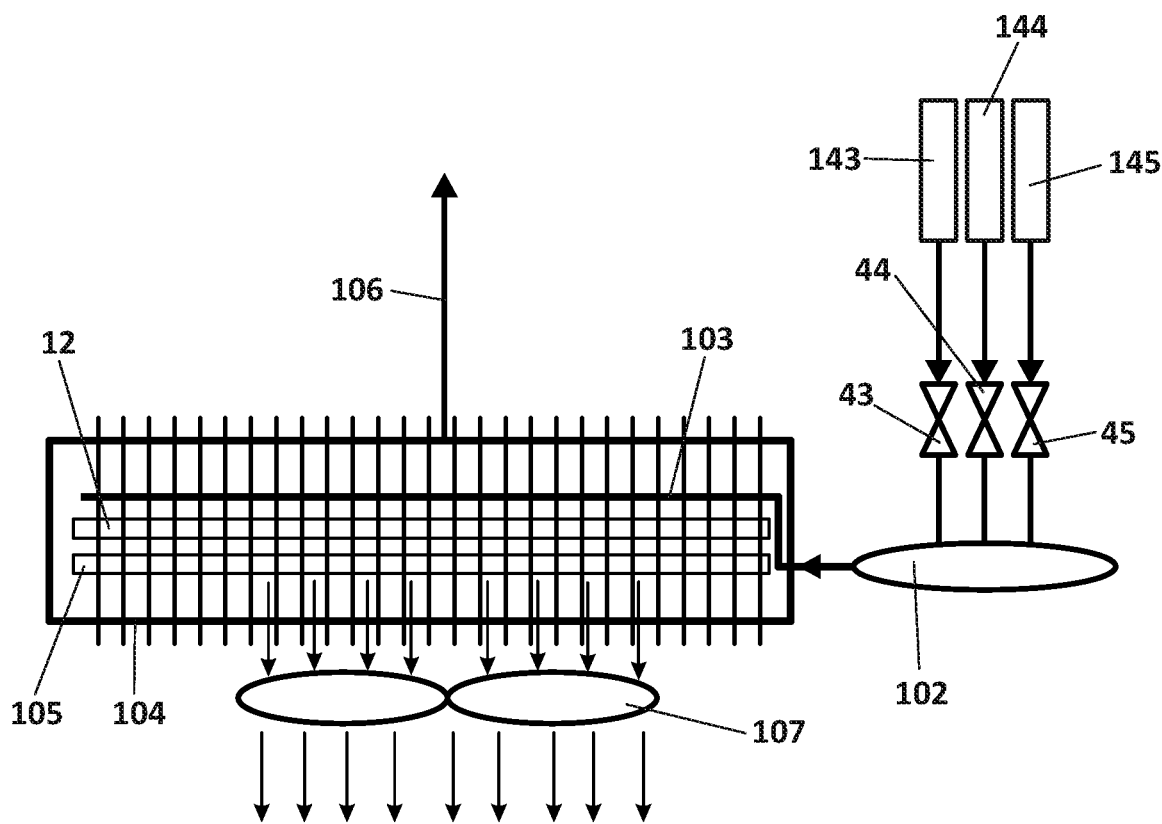
FIG. 4. Shows a diagram of the direct expansion evaporator of the low-power absorption refrigeration machine of the present invention to configure a triple-effect low-power absorption machine.

In a fourth example of embodiment shown in FIG. 4, wherein the solution is lithium bromide/water (LiBr/H$_2$O) or a solution with similar properties (pressure and temperature), the interior unit (100) comprises the elements described for the first example of embodiment, but wherein the evaporator (12) works with refrigerant from the three expansion valves (43, 44, 45): a first expansion valve (43) that feeds refrigerant from a low-pressure generator (143), a second expansion valve (44) that feeds refrigerant from a medium-pressure generator (144) and a third expansion valve (45) that feeds refrigerant from a high-pressure generator (145), thereby configuring a triple-effect direct absorption machine.

Figure 5:
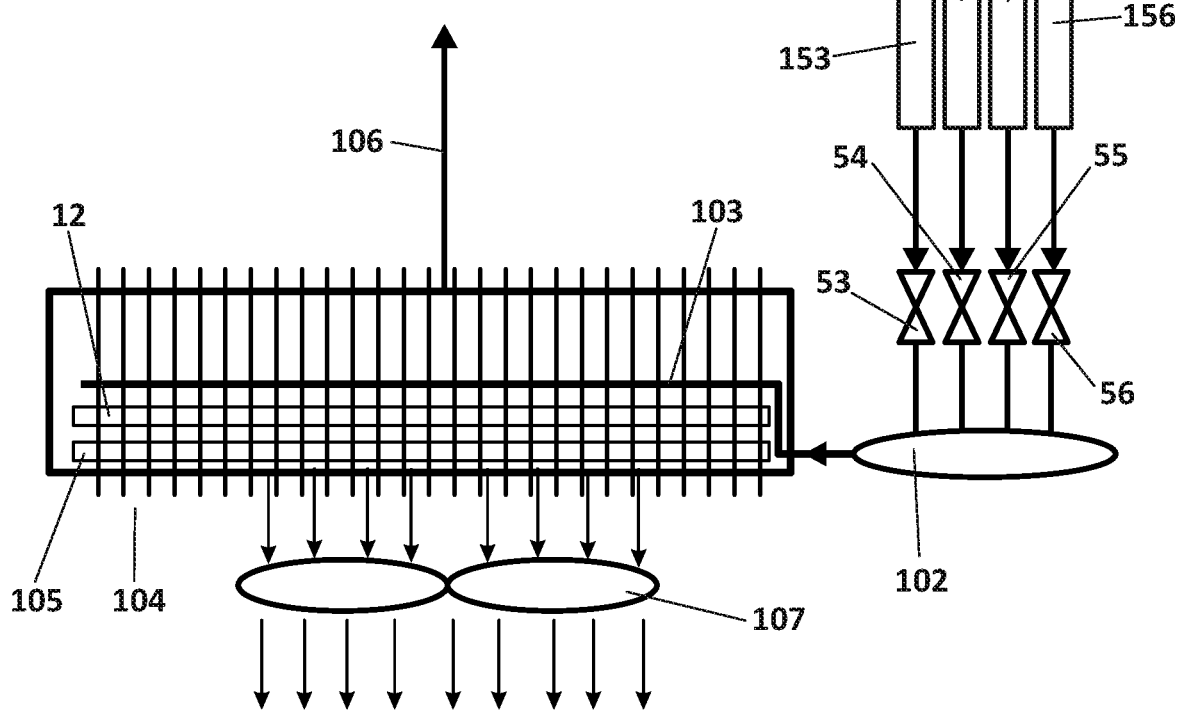
FIG. 5. Shows a diagram of the direct expansion evaporator of the low-power absorption refrigeration machine of the present invention to configure a single- and triple-effect low-power absorption machine built in a single unit.
Figure 6:
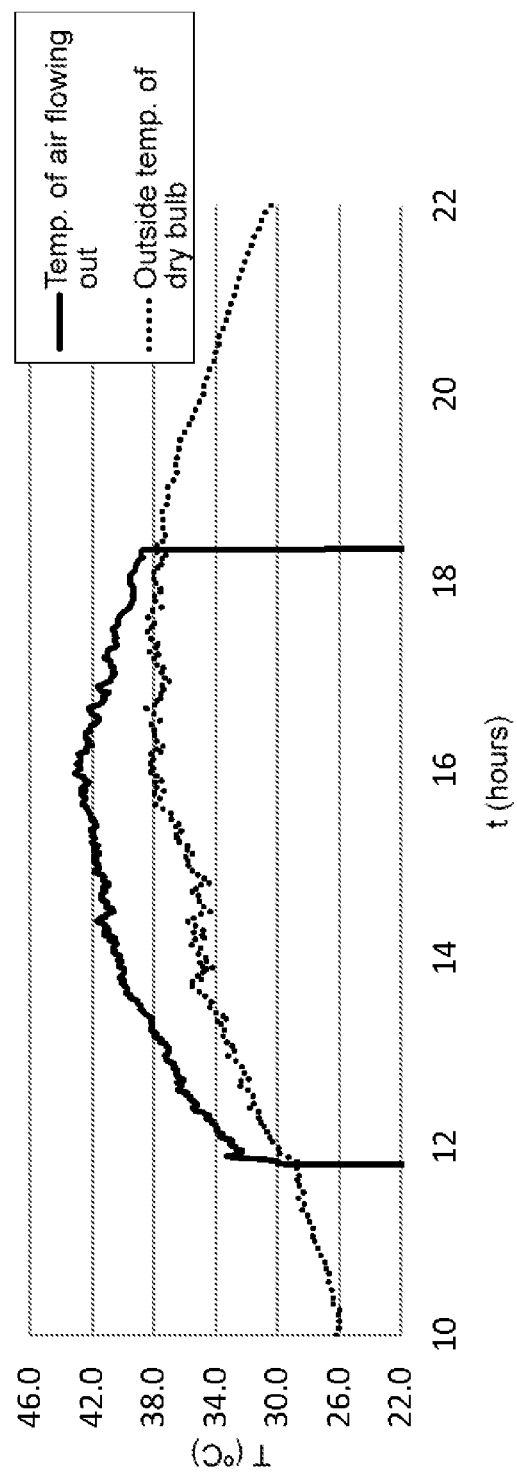
FIG. 6. Shows a graph illustrating the evolution over time of the temperature of the air that flows out of the condenser and the outside temperature of the dry bulb of the low-power absorption refrigeration machine of the present invention, when it is of the single-effect type.
Figure 7:
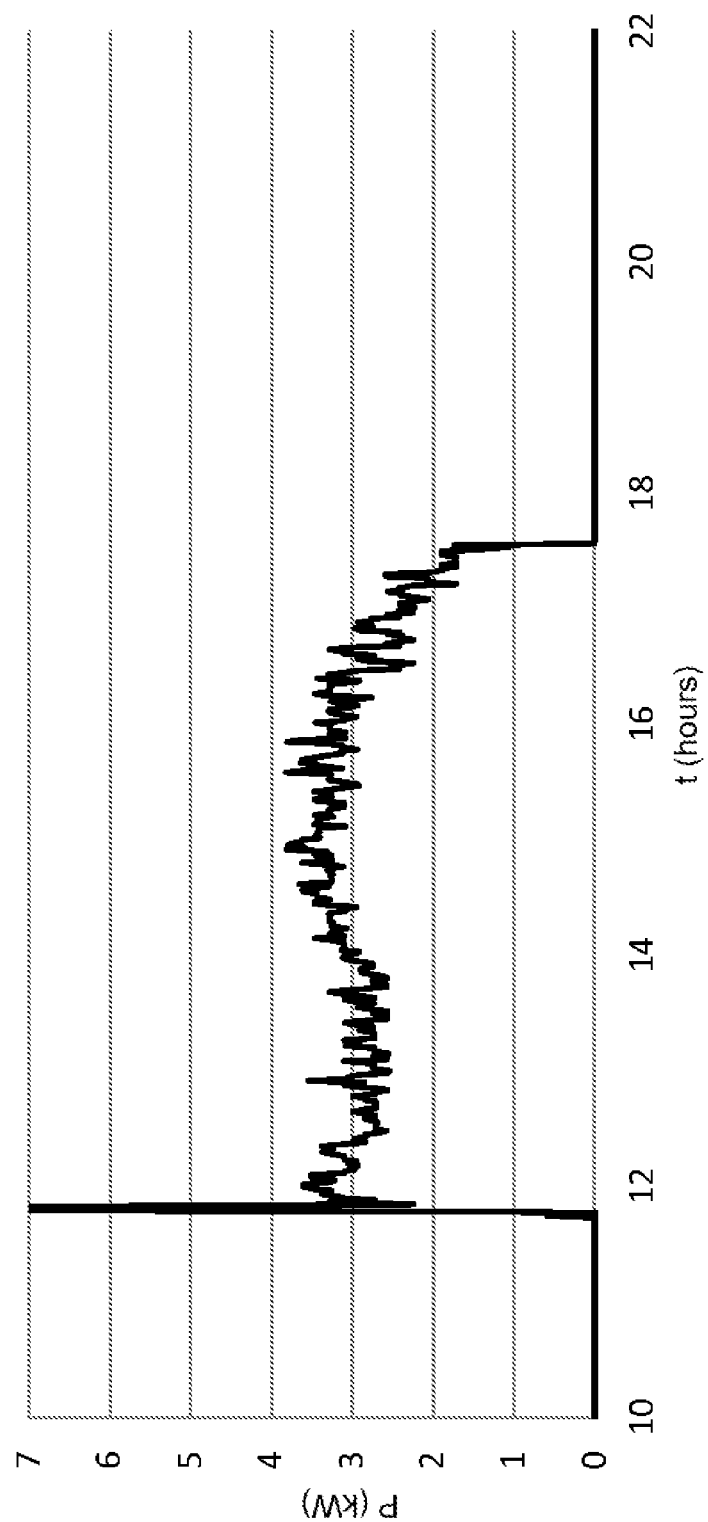
FIG. 7. Shows a graph illustrating the evolution over time of the power supplied to the single-effect generator of the low-power absorption refrigeration machine of the present invention.
Figure 8:
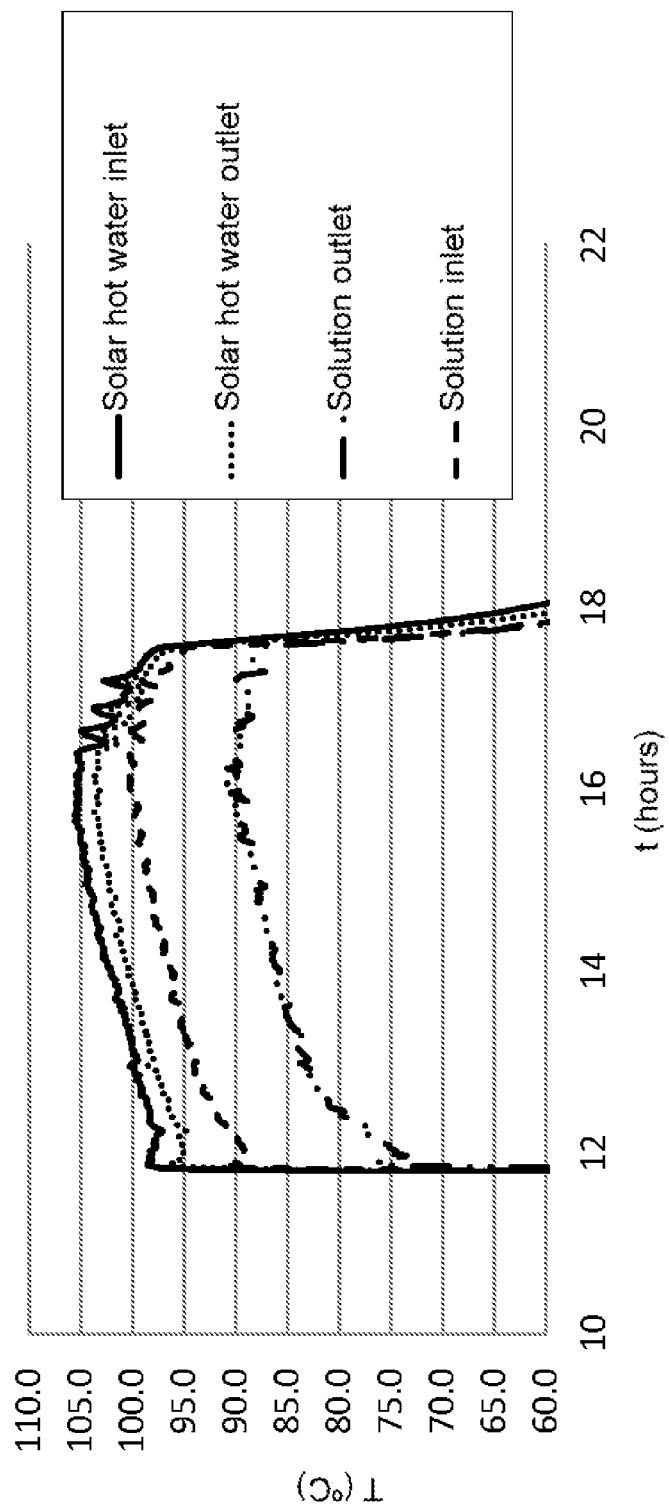
FIG. 8. Shows a graph illustrating the evolution over time of the temperatures in the single-effect generator of the low-power absorption refrigeration machine of the present invention.
Figure 9:
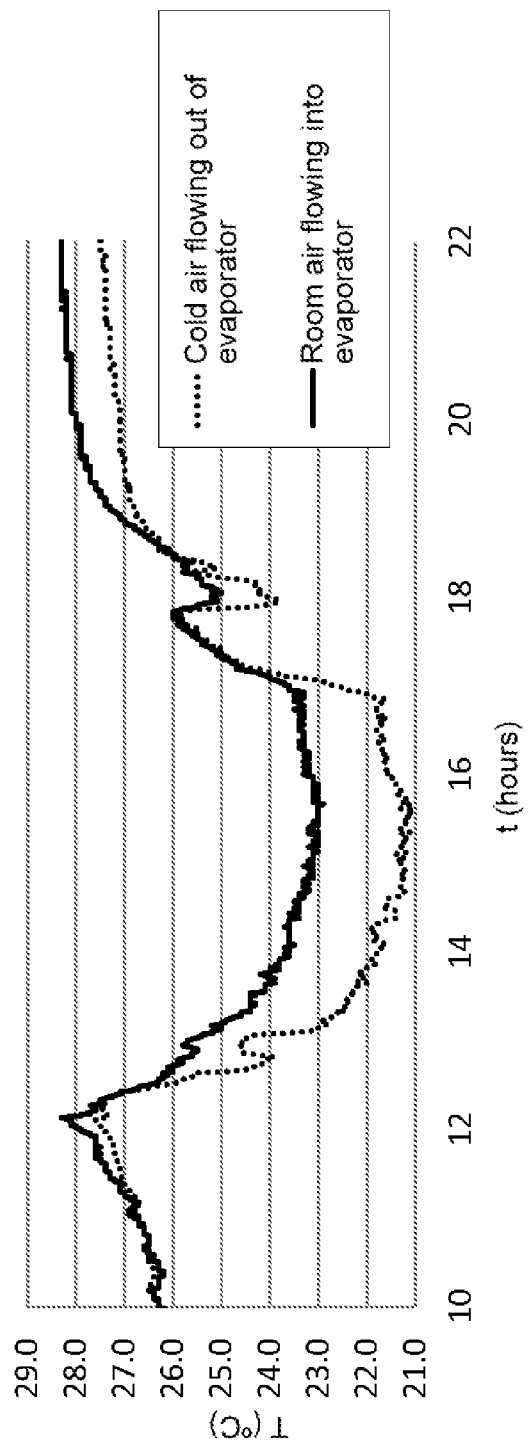
FIG. 9. Shows a graph illustrating the evolution over time of the temperature of the cold air that flows out of the evaporator and the temperature of the air inside the room that flows into the evaporator where the low-power absorption refrigeration machine of the present invention is installed, when it is of the single-effect type.
Figure 10:
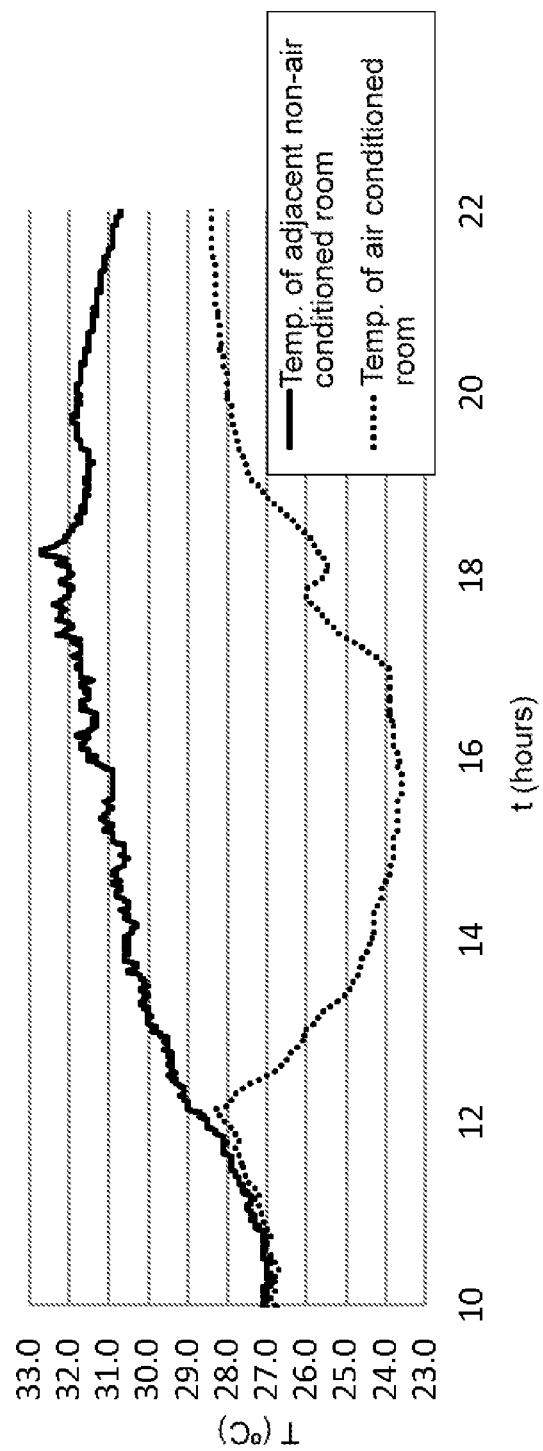
FIG. 10. Shows a graph illustrating the evolution over time of the temperature of the adjacent, non-air conditioned room and the temperature of the air conditioned room where the low-power absorption refrigeration machine of the present invention is installed when, it is of the single-effect type.
Figure 11:
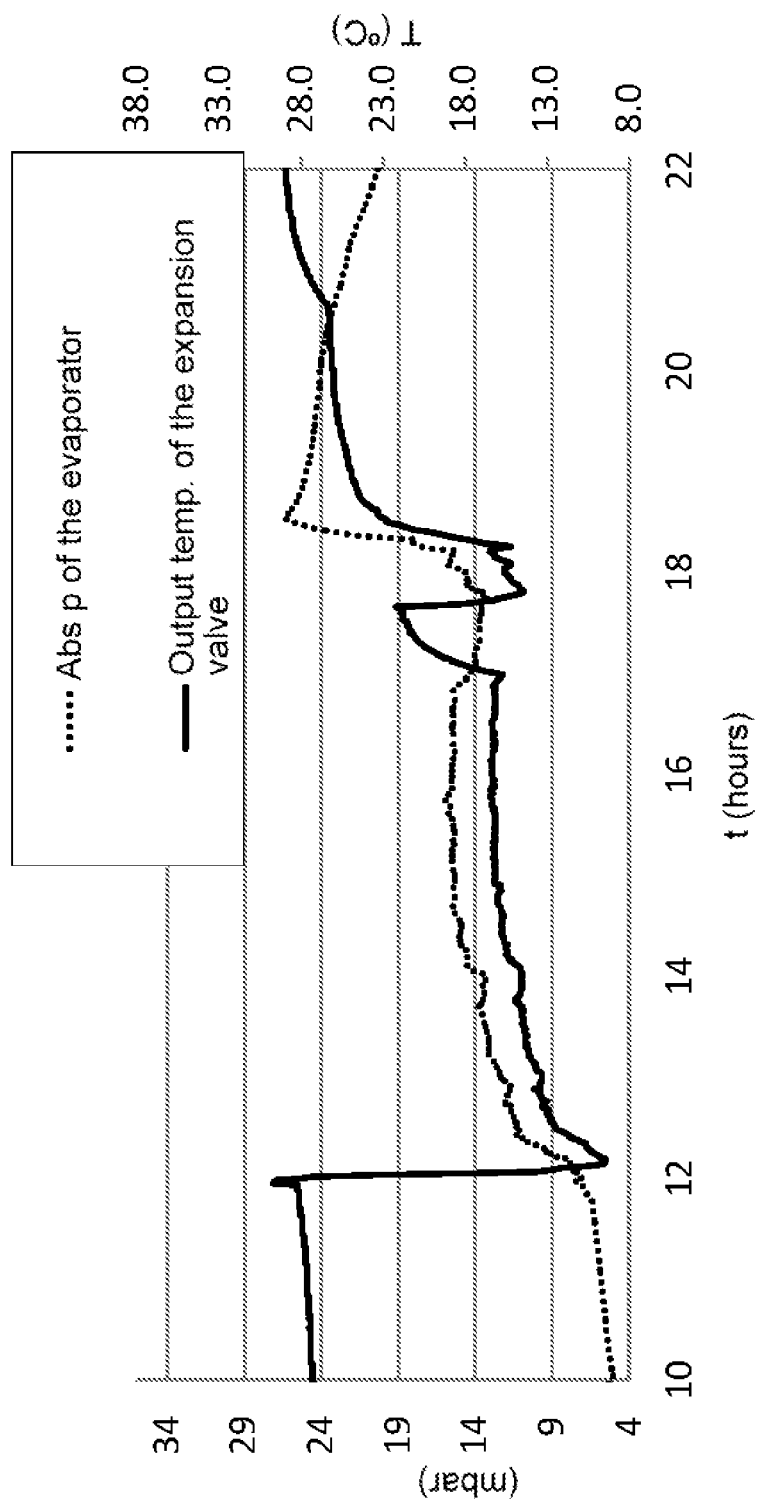
FIG. 11. Shows a graph illustrating the evolution over time of the temperature of the absolute pressure of the evaporator and of the output temperature of the expansion valve of the low-power absorption refrigeration machine, when it is of the single-effect type.

In a fifth example of embodiment shown in FIG. 5, wherein the solution is lithium bromide/water (LiBr/H$_2$O) or a solution having similar physical properties (pressure and temperature), the interior unit (100) comprises the elements described for the first example of embodiment, but wherein the evaporator (12) works with refrigerant from four expansion valves (53, 54, 55, 56), a first expansion valve (53) that feeds refrigerant from a single-effect generator (153), a second expansion valve (54) that feeds refrigerant from a low-pressure triple-effect generator (154), a third expansion valve (55) that feeds refrigerant from a medium-pressure triple-effect generator (155) and a fourth expansion valve (56) that feeds refrigerant from a high-pressure triple-effect generator (156), thereby configuring a single and triple-effect direct expansion absorption machine built in a single unit.

The absorption machine also comprises a vaporized refrigerant duct (106) that joins the interior unit (100) to the exterior unit (200) to introduce water vapour in the absorber (3).

The heat exchanger (6) of the absorption machine is a solution-air exchanger, as represented in FIG. 1, having a fan (16) associated with said exchanger, although it is also envisaged that, while maintaining the peculiarities described in the preceding paragraph, the heat exchanger (6) may be of the solution-water type.

The fan (16) of the solution-air exchanger (6) may be the same as the fan (16) that cools the condenser (11), as can be observed in FIG. 1.

The generator (1) may incorporate a heat exchanger (not shown) in the heating chamber (2) and/or may incorporate a fossil fuel burner associated with the heating chamber (not shown).

EXAMPLE

FIGS. 6 to 11 show an example of application of the low-power absorption refrigeration machine when it is of the single-effect type, wherein the energy supplied to the single-effect generator is 17.37 kWh per day, wherein it can be observed that the average power supplied is 3-4 kW.

The invention claimed is:

1. A low-power absorption refrigeration machine for use in climate control or air conditioning installations that comprises a working solution being LiBr/H$_2$O, wherein the low-power absorption refrigeration machine comprises an exterior unit and an interior unit,
    wherein the exterior unit comprises:
        an absorber capable of maintaining a low pressure and low evaporation temperature when the outside temperature is high, directly cooled by outside air or by water, that carries out separated heat and mass transfer processes,
        a condenser directly cooled by outside air,
        at least one refrigerant generator, and
        a heat recuperator, and
    wherein the interior unit comprises:
        at least one expansion valve that connects the condenser to an expansion evaporator through a liquid refrigerant flows at high pressure by means of a refrigerant in liquid state and in vapour state, wherein the at least one expansion valve reduces the pressure and temperature to the operating values of the evaporator, which in turn comprises:
        a liquid refrigerant distributor,
        an air-refrigerant heat exchanger,
        a water vapour collector integrated in the evaporator, and
        a fan that suctions the air of an enclosure to be air conditioned and impels the cooled air, mixing the cooled air with hot air of the enclosure,
    wherein the evaporator is a direct expansion evaporator disposed in the enclosure to be air conditioned, wherein the exterior unit is separated from the interior unit thus configuring a split air-air type absorption refrigeration machine and both units being connected by two ducts: the first duct wherethrough the liquid refrigerant flows from the condenser to the evaporator at high pressure and a second duct that transports the vaporised refrigerant from the evaporator of the interior unit to the exterior unit, once said refrigerant has flowed through the evaporator.

2. The machine of claim 1 wherein the interior unit comprises two expansion valves, a first expansion valve that feeds refrigerant from a low-pressure generator and a second expansion valve that feeds refrigerant from a high-pressure generator, thereby configuring a double-effect direct expansion absorption machine.

3. The machine of claim 1 wherein the interior unit comprises three expansion valves, a first expansion valve that feeds refrigerant from a single-effect generator, a second expansion valve that feeds refrigerant from a double-effect generator and a third expansion valve that feeds refrigerant from a high-pressure double effect generator, thereby configuring a single and double-effect direct expansion absorption machine built in a single unit.

4. The machine of claim 1 wherein the interior unit comprises three expansion valves, a first expansion valve that feeds refrigerant from a low-pressure generator, a second expansion valve that feeds refrigerant from a medium-pressure generator and a third expansion valve that feeds refrigerant from a high-pressure generator, thereby configuring a triple-effect direct expansion absorption machine.

5. The machine of claim 1 wherein the interior unit comprises four expansion valves, a first expansion valve that feeds refrigerant from a single-effect generator, a second expansion valve that feeds refrigerant from a low-pressure triple-effect generator, a third expansion valve that feeds refrigerant from a medium-pressure triple-effect generator and a fourth expansion valve that feeds refrigerant from a high-pressure triple-effect generator, thereby configuring a single and triple-effect direct expansion absorption machine built in a single unit.

6. The machine of claim 1, wherein the separation between the evaporator disposed in the interior unit and the absorber disposed in the exterior unit is 1 to 2 m.

7. The machine of claim 6 wherein the interior unit comprises two expansion valves, a first expansion valve that feeds refrigerant from a low-pressure generator and a second expansion valve that feeds refrigerant from a high-pressure generator, thereby configuring a double-effect direct expansion absorption machine.

8. The machine of claim 6 wherein the interior unit comprises three expansion valves, a first expansion valve that feeds refrigerant from a single-effect generator, a second expansion valve that feeds refrigerant from a double-effect generator and a third expansion valve that feeds refrigerant from a high-pressure double effect generator, thereby configuring a single and double-effect direct expansion absorption machine built in a single unit.

9. The machine of claim 6 wherein the interior unit comprises three expansion valves, a first expansion valve that feeds refrigerant from a low-pressure generator, a second expansion valve that feeds refrigerant from a medium-pressure generator and a third expansion valve that feeds refrigerant from a high-pressure generator, thereby configuring a triple-effect direct expansion absorption machine.

10. The machine of claim 6 wherein the interior unit comprises four expansion valves, a first expansion valve that feeds refrigerant from a single-effect generator, a second expansion valve that feeds refrigerant from a low-pressure triple-effect generator, a third expansion valve that feeds refrigerant from a medium-pressure triple-effect generator and a fourth expansion valve that feeds refrigerant from a high-pressure triple-effect generator, thereby configuring a single and triple-effect direct expansion absorption machine built in a single unit.

11. The machine of claim 6, wherein the separation between the evaporator disposed in the interior unit and the absorber disposed in the exterior unit is greater than 2 m.

12. The machine of claim 11 wherein the interior unit comprises two expansion valves, a first expansion valve that feeds refrigerant from a low-pressure generator and a second expansion valve that feeds refrigerant from a high-pressure generator, thereby configuring a double-effect direct expansion absorption machine.

13. The machine of claim 11 wherein the interior unit comprises three expansion valves, a first expansion valve that feeds refrigerant from a single-effect generator, a second expansion valve that feeds refrigerant from a double-effect generator and a third expansion valve that feeds refrigerant from a high-pressure double effect generator, thereby configuring a single and double-effect direct expansion absorption machine built in a single unit.

* * * * *

UNITED STATES PATENT AND TRADEMARK OFFICE
CERTIFICATE OF CORRECTION

PATENT NO. : 10,845,100 B2  
APPLICATION NO. : 15/315066  
DATED : November 24, 2020  
INVENTOR(S) : Marcelo Izquierdo Millan and Emilio Martin Lazaro It is certified that error appears in the above-identified patent and that said Letters Patent is hereby corrected as shown below:

In the Claims

Column 7, Claim 1, Line 55, after "through", insert --a first duct wherethrough--.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*